(12) United States Patent
Quam et al.

(10) Patent No.: US 7,017,502 B2
(45) Date of Patent: Mar. 28, 2006

(54) PNEUMATIC PLUG FOR A SEED METER

(75) Inventors: Dale Alan Quam, Davenport, IA (US); Scott Charles McCartney, Davenport, IA (US)

(73) Assignee: Deere & Company, Moline, IL (US)

( * ) Notice: Subject to any disclaimer, the term of this patent is extended or adjusted under 35 U.S.C. 154(b) by 111 days.

(21) Appl. No.: 10/639,407

(22) Filed: Aug. 11, 2003

(65) Prior Publication Data

US 2005/0034640 A1    Feb. 17, 2005

(51) Int. Cl.
*A01C 7/00* (2006.01)
*A01C 9/00* (2006.01)

(52) U.S. Cl. ........................ 111/174; 111/200
(58) Field of Classification Search ................ 111/170, 111/174–176, 179–182, 185, 200; 221/211
See application file for complete search history.

(56) References Cited

U.S. PATENT DOCUMENTS

2001/0011464 A1 * 8/2001 Waco .................... 62/303

FOREIGN PATENT DOCUMENTS

DE        10307532 A1 *  9/2004

OTHER PUBLICATIONS

John Deere Brochure, "Accuracy Experts", pp. 16 & 21, Front Cover & Back Cover Pages, Published Aug. 1990.
Case International Brochure, "900 Series Early Riser Cycle Air Planters", Front Cover Page, pp. 12 & 13, Received in Patent Department Sep. 26, 1990.
John Deere Operator's Manual, "MaxEmerge 2 Split Row Planting Attachment", pp. 6-12, Front Cover & Back Cover Pages, Published 1987.

* cited by examiner

*Primary Examiner*—Christopher J. Novosad

(57) ABSTRACT

A pneumatic plug is used to seal off a pneumatic pressure source from a pneumatic pressure seed meter. The pneumatic plug comprises an annular rim defining an annular cavity, a insert portion and a sealing wall. The plug is an integral rubber body. The insert portion is inserted into a pneumatic hose supplying pneumatic pressure to the seed meter. The annular rim defines an annular cavity into which the pneumatic inlet of the seed meter is received. The annular cavity is provided with two inwardly extending sealing ridges that engage the outer sidewalls of the pneumatic inlet. The sealing wall provides a pneumatic seal for the pneumatic hose.

10 Claims, 1 Drawing Sheet

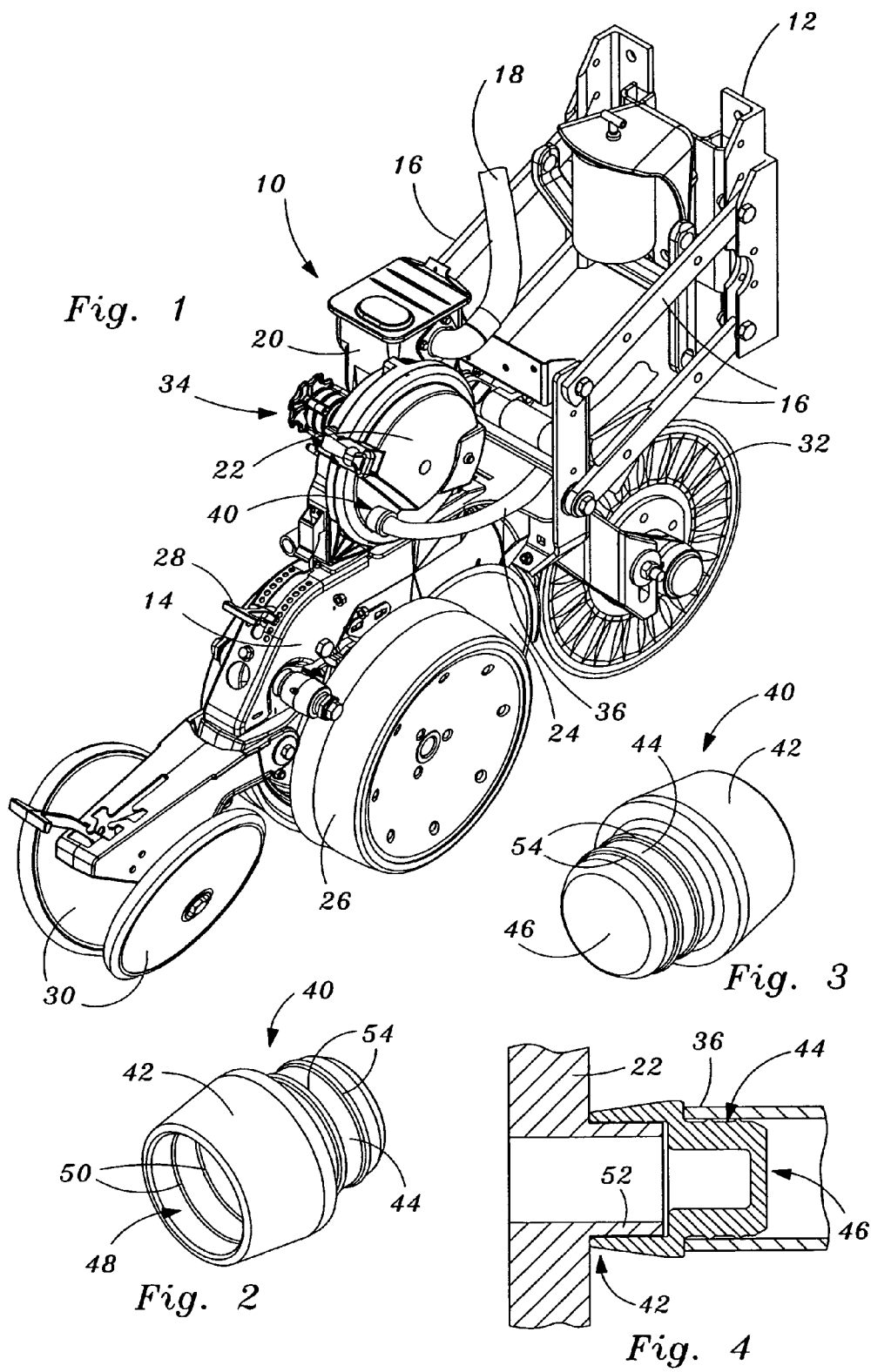

PNEUMATIC PLUG FOR A SEED METER

FIELD OF THE INVENTION

The present invention is directed to a pneumatic plug for a pneumatic hose on a seed meter which has an inlet portion that can be mounted to the pneumatic inlet of the seed meter.

BACKGROUND OF THE INVENTION

Pneumatic seed meters are well known in the art. There are two basic types of pneumatic seed meters, positive air pressure seed meters and vacuum seed meters. Both of these types of pneumatic seed meters have a rotatable disc located in a housing. The rotatable disc is provided with circumferentially spaced apertures defining seed locations. The rotatable disc is rotated through a seed puddle and the individual seeds are attracted to the spaced apertures by the difference in pneumatic pressure on one side of the disc from the other. The individual seeds are then taken up by the disc and rotated to an outlet where the differential pneumatic pressure is removed and the seed is deposited into a seed tube for travel to a planting furrow.

In a positive pressure seed meter the difference in pneumatic pressure is created from a positive pressure source. The seed puddle, in a positive pressure seed meter, is located on the same side of the disc as source of positive pneumatic air pressure. In a vacuum seed meter the difference in pneumatic pressure is created by negative air pressure. The seed puddle, in a vacuum seed meter, is located on the opposite side of the disc from the source of negative pneumatic pressure.

Row crop planters are typically provided with a plurality of planting units. Each of the planting units have a seed meter. Sometimes it is desirable to disable a number of the planting units while still planting. For example every other planting unit may be disabled, so that the row crop planter can plant thirty inch row corn instead of fifteen inch row soybeans. First the planting unit is lifted off the ground and locked in place. With pneumatic pressure seed meters it is also necessary to close off the pneumatic pressure source. One solution is to remove the pneumatic hose supplying pneumatic pressure to the seed meter from a pneumatic manifold. The pneumatic hose opening in the manifold is then closed off with a rubber cap. This operation can prove difficult as the manifold can be difficult to get to. In addition, the pneumatic hose is left free to hang leaving it susceptible to damage.

SUMMARY OF THE INVENTION

It is an object of the present invention to provide a pneumatic plug for a pneumatic pressure seed meter that closes off a pneumatic hose and which mounts the closed off hose to the seed meter.

A pneumatic plug is used to seal off a pneumatic pressure source from a pneumatic pressure seed meter. The pneumatic plug comprises an annular rim defining an annular cavity, an insert portion and a sealing wall. The plug is an integral rubber body. The insert portion of the pneumatic plug is inserted into the pneumatic hose supplying pneumatic pressure to the pneumatic pressure seed meter. The insert portion is provided with two outwardly extending sealing ridges that engage the interior sidewalls of the hose. The annular rim of the plug is mounted over the pneumatic inlet of the pneumatic pressure seed meter that was previously covered by the pneumatic hose. The sealing wall is adjacent the insert portion and provides a pneumatic seal for the pneumatic hose.

It is also desirable to make the pneumatic plug in a contrasting color from the seed meter so that the operator can readily ascertain if the pneumatic plug is in place.

BRIEF DESCRIPTION OF THE DRAWINGS

FIG. 1 is a perspective view of a seeding machine.
FIG. 2 is a front perspective view of a pneumatic plug.
FIG. 3 is a rear perspective view of the pneumatic plug.
FIG. 4 is a cross sectional view of the pneumatic plug mounted to the seeding machine.

DETAILED DESCRIPTION

The seeding machine 10 comprises an individual row crop planting unit that is mounted to a transverse toolbar, not shown, by U-bolts that engage a mounting plate 12. The planting unit is provided with a frame 14 that is coupled to the mounting plate 12 by a parallel linkage 16. The parallel linkage 16 allows the planting unit to move up and down to a limited degree relative to the toolbar. Seed is automatically directed to the planter by a pneumatic seed on demand delivery system. The seed on demand delivery system directs the seed pneumatically from a main hopper, not shown, through seed hose 18 to an auxiliary hopper 20 mounted on fame 14. Seed in the auxiliary hopper 20 is metered by a pneumatic pressure seed meter 22 and directed to a planting furrow by a seed tube, not shown.

The planting furrow is formed by a double disc furrow opener 24 having depth gauging wheels 26. The depth of the planting furrow is controlled by the positioning of handle 28 which controls the vertical position of the depth gauging wheels 26 relative to the furrow opener 24. The planting furrow with metered seed deposited therein by the seed tube is closed by closing wheels 30. A forward mounted coulter 32 is used for slicing through crop residue before it encounters the furrow opener 24.

The seed meter 22 is driven by a flexible rotatable drive shaft, not shown, that drives gear box 34. The flexible and rotatable drive shaft is of a type manufactured and marketed by Elliott Manufacturing Company, LLC. of Binghamton, N.Y. A ground driven transmission, not shown, provides a rotational input into the flexible drive shaft. In this way the ground speed of the seeding machine 10 controls the speed of the seed meter 22.

The illustrated seed meter 22 is a vacuum seed meter. That means the seed meter 22 uses negative air pressure to attract seeds to a rotating disc having seed positions defined by circumferentially arranged apertures. A pneumatic hose 36 couples the seed meter to a vacuum source. Although the present invention is illustrated as a vacuum seed meter, it can also be used with a positive pressure seed meter.

If it is desirable to deactivate a planting unit while using other planting units on a seeding machine, the plug 40 of the present invention can be used to close off the vacuum from the deactivated planting unit. The plug 40 comprises a rubber body having an annular rim 42, an insert portion 44 and a sealing wall 46. The annular rim 42 defines an annular cavity 48 which engages the pneumatic inlet 52 of the seed meter 22. The annular rim 42 and the annular cavity 48 defined by the rim are both cylindrical. The annular rim 42 is provided with two inwardly projecting sealing ridges 50 for engaging the outer sidewall of the pneumatic inlet 52.

The insert portion 44 is cylindrical for insertion into the pneumatic hose 36. The insert portion 44 is provided with two outwardly projecting sealing ridges 54 that engage the inner sidewall of the pneumatic hose 36.

The sealing wall 46 pneumatically seals the pneumatic hose 36. The insert portion 44 has a first end adjacent to the annular rim 42 and a second end opposite the first end on which the sealing wall 46 is located.

To make a planting unit inactive, an operator lifts the planting unit upward out of contact with the ground and locks it in place. The operator then removes the pneumatic hose 36 from the seed meter 22. The insert portion 44 of the plug 40 is inserted into the end of the hose 34 and the annular rim 42 is then mounted over the pneumatic inlet 52. In this way the hose 34 is pneumatically sealed by the sealing wall 46. The hose 34 is also restrained from flopping around and becoming damaged by mounting the annular rim 42 over the pneumatic inlet 52 of the seed meter 22.

Having described the illustrated embodiment, it will become apparent that various modifications can be made without departing from the scope of the invention as defined in the accompanying claims.

What is claimed is:

1. A seeding machine for applying seed to a field, the seeding machine comprising:
   a frame;
   a furrow opener mounted to the frame for forming a planting furrow;
   a pneumatic pressure seed meter mounted to the frame, the pneumatic pressure seed meter using pneumatic pressure to meter seed being directed to a planting furrow;
   a pneumatic hose coupled to the pneumatic pressure seed meter, the pneumatic hose being provided with a plug that is attached to and pneumatically seals the pneumatic hose from the pneumatic pressure seed meter, the plug being mounted to the pneumatic pressure seed meter.

2. The seeding machine as defined by claim 1 wherein pneumatic pressure seed meter is provided with a pneumatic inlet and the plug is provided with an annular rim that defines an annular cavity into which the pneumatic inlet is received.

3. The seeding machine as defined by claim 2 wherein the plug is provided with an insert portion which is inserted into the pneumatic hose.

4. The seeding machine as defined by claim 3 wherein the plug is provided with a sealing wall to pneumatically seal the pneumatic hose.

5. The seeding machine as defined by claim 4 wherein the plug is an integral rubber body including the annular rim, the insert portion and the sealing wall.

6. The seeding machine as defined by claim 5 wherein the annular rim and the insert portion are cylindrical.

7. The seeding machine as defined by claim 6 wherein the insert portion has a first end adjacent the annular rim and a second end opposite the first end having the sealing wall.

8. The seeding machine as defined by claim 7 wherein the annular rim is provided with two inwardly extending sealing ridges and the insert portion is provided with two outwardly extending sealing ridges.

9. The seeding machine as defined by claim 6 wherein the pneumatic pressure seed meter is a vacuum seed meter.

10. The seeding machine as defined by claim 1 wherein the pneumatic pressure seed meter is provided with a pneumatic inlet and the plug is provided with an annular rim defining an annular cavity that mounts to the pneumatic inlet, the insert portion having a sealing wall for pneumatically sealing the pneumatic hose, the plug also being provided with an insert portion which is inserted into the pneumatic hose, the insert portion and the annular rim being cylindrical.

* * * * *